Figure 1:
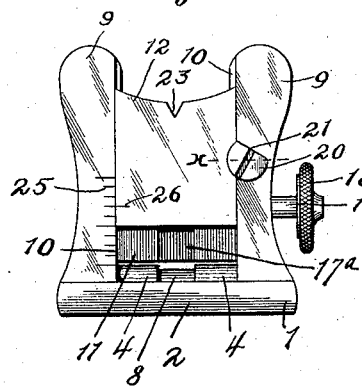

No. 783,092. PATENTED FEB. 21, 1905.
J. Y. BASSELL & F. C. BLENKNER.
GUN SIGHT.
APPLICATION FILED MAR. 10, 1904.

WITNESSES:

H. B. Bradshaw

INVENTORS
J. Y. Bassell & F. C. Blenkner
BY
Shepherd & Parker
ATTORNEYS

No. 783,092.                                                    Patented February 21, 1905.

UNITED STATES PATENT OFFICE.

JOHN Y. BASSELL AND FRED C. BLENKNER, OF COLUMBUS, OHIO.

GUN-SIGHT.

SPECIFICATION forming part of Letters Patent No. 783,092, dated February 21, 1905.

Application filed March 10, 1904. Serial No. 197,418.

*To all whom it may concern:*

Be it known that we, JOHN Y. BASSELL and FRED C. BLENKNER, citizens of the United States, residing at Columbus, in the county of Franklin and State of Ohio, have invented a certain new and useful Improvement in Gun-Sights, of which the following is a specification.

Our invention relates to an improvement in gun-sights, and more particularly to that class known as "open" sights.

The object of the invention resides in providing an adjustable sight-plate and means whereby sight-plates of various designs may be employed; also, means for adjusting the plate to the finest degree and means for locking the same in its adjusted position, together with means whereby the sight may be folded down flush with the gun-barrel and out of the line of vision of the peep-sight.

Finally, the object is to provide a sight that will be strong, durable, and efficient and one in which the parts will not be liable to get out of working order.

With the above and other objects in view the invention consists of the novel details of construction and operation, a preferable embodiment of which is described in the specification and illustrated by greatly enlarged views in the drawings, wherein—

Figure 2:
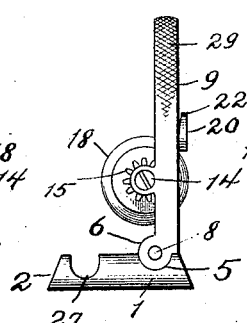
Figure 3:
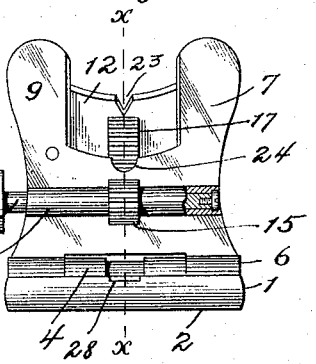
Figure 4:
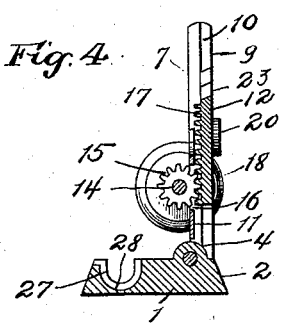
Figure 5:
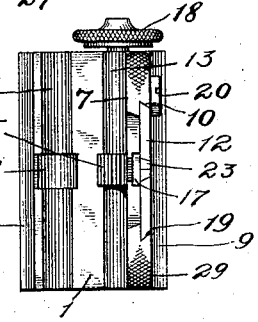
Figure 6:
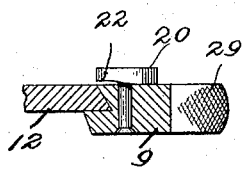
Figure 7:
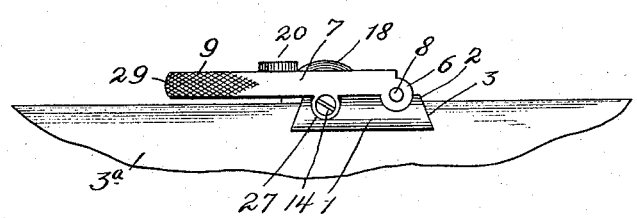
Figure 8:
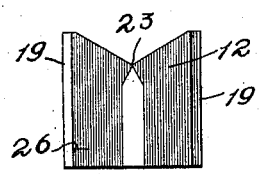
Figure 9:
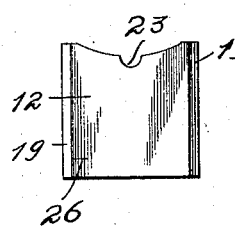

Figure 1 is an enlarged rear elevation. Fig. 2 is an enlarged side elevation. Fig. 3 is a front elevation. Fig. 4 is a longitudinal sectional view. Fig. 5 is a plan view. Fig. 6 is an enlarged detail transverse sectional view on line $x\ x$ of Fig. 1. Fig. 7 is a side elevation of the sight in its folded position, showing the same applied to a gun-barrel. Fig. 8 is a front elevation of one of the various forms of sight-plate which may be used, and Fig. 9 is a similar view of another form of sight-plate.

In the drawings the numeral 1 designates the base-block, which is formed with beveled sides 2, adapted to fit the ordinary dovetailed groove 3, formed in gun-barrel $3^a$, as shown in Fig. 7, whereby the sight may be readily applied to and removed from the gun-barrel. The block 1 is provided with a pair of upwardly-projecting semicircular bearing-lugs 4, on each side of which are formed semicircular recesses 5, in which rest the hinge-lugs 6 of the sight-frame 7, connected by a transverse pivot-pin 8 to form a hinge-joint, whereby the frame 7 may be folded down flush with the base-block 1. The frame 7 is formed with a pair of oppositely-disposed guide-standards 9, having angular guideways 10 in their adjacent edges and connected across their lower half by a web 11, thus providing a vertical recess in the face of the frame, in which slides the sight-plate 12. At the rear side of the frame 7 is placed an integral bearing-sleeve 13, having a central opening and supporting a transverse operating-shaft 14, having keyed therein a pinion 15, standing in the aforesaid opening and projecting through a slot 16 in the web 11. The sight-plate 12 is formed on its rear face with an integral rack 17, which lies in a groove $17^a$, formed in the web 11 and adapted to be engaged by the pinion 15, which when rotated by the shaft 14 through the wheel 18, carried on the end thereof, raises or lowers the said sight-plate 12. The sight-plate 12 is formed with beveled edges 19, which lie in the guideways 10, thus holding it against lateral displacement and yet allowing a free vertical sliding movement. A binding or setting button 20 is pivoted at one of the standards 9 adjacent to the edge of the guideway 10 and formed with a flat edge 21 and a reduced cam-surface 22 on its under side. This button may be turned to bear upon the slide-plate 12, as shown in Fig. 1, to lock the said plate from movement after the same has been adjusted.

The sight-plate 12 is interchangeable, being readily removable from the guideways 10 by simply sliding it vertically. We wish it understood that we may use various forms of sight-plates, all of which, however, are provided with central notches or sighting-points 23, adapted to register with the notch 24, formed in the upper center edge of the web 11 when the plate is in its lowermost position. We have illustrated in Figs. 8 and 9 a couple of modified sight-plates, which, however, form only a part of the many different designs which may be employed.

The standard 9 opposite that carrying the button 20 is formed along its edge contiguous to the guideway 10 with a suitably-graduated scale 25, which is adapted to act in conjunction with the index-point 26, provided on each plate 12.

In order that the sight may be folded down flush with the base-block 1 and parallel with the gun-barrel $3^a$, the base-block is formed with a transverse groove 27, having the enlarged recess 28 to receive the sleeve 13 and the pinion 15 when the sight is folded down, as shown in Fig. 7. To facilitate the folding and unfolding of the sight, we form the upper ends of the standards 9 with milled edges 29, affording means by which the standards may be more securely grasped between the thumb and forefinger of the operator.

The desired sight-plate having been selected is inserted in the guideway 10 and pushed down until the rack 17 meshes with the pinion 15, when by manipulating the wheel 18 the plate 12 may be adjusted vertically to suit the fancy of the operator, in which he is assisted by the index 26 and scale 25. The plate 12 having been set at the desired point, the button 20 is turned to cause its enlarged end to stand over and bind the said plate, as clearly shown in Fig. 1, thus locking the sight-plate in its adjusted position.

We do not wish to limit ourselves to the exact details of construction and operation herein set forth, as we may make various changes in the same without departing from the spirit of our invention and wholly within the scope of our claims.

Having now fully described our invention, what we claim, and desire to secure by Letters Patent, is—

1. In a gun-sight, interchangeable sight-plates each formed with a rack, a pinion adapted to engage the rack for adjusting the plate, and means for securing the plate in its adjusted position.

2. In a gun-sight, a folding frame, a plate adjustable in the frame, a rack formed on the plate, a pinion supported on the frame and engaging the rack to adjust the same, and a button adapted to engage the plate to lock the same.

3. In a gun-sight, a folding frame provided with guideways, a removable sight-plate adapted to slide in the guideways, a rack formed on the sight-plate, a shaft supported by the frame, a pinion fixed on the shaft and meshing with the rack, means for rotating the shaft to adjust the sight-plate, and a cam-faced button adapted to engage the sight-plate to lock the same in its adjusted position.

JOHN Y. BASSELL.
FRED C. BLENKNER.

In presence of—
M. B. SCHLEY,
W. L. MORROW.